United States Patent [19]
Wagner

[11] Patent Number: 6,128,915
[45] Date of Patent: Oct. 10, 2000

[54] PORTABLE FOOD AND BEVERAGE COOLING DEVICE

[76] Inventor: Peter P. G. Wagner, Suite #202 @ 6575 Royal Avenue, West Vancouver, Canada, V7W 2B4

[21] Appl. No.: 09/307,341

[22] Filed: May 6, 1999

[51] Int. Cl.⁷ .................................................. F25D 3/08
[52] U.S. Cl. ............................................ 62/457.3; 62/530
[58] Field of Search ................ 62/457.2, 457.3, 62/457.4, 371, 372, 529, 530

[56] References Cited

U.S. PATENT DOCUMENTS

| | | | |
|---|---|---|---|
| 4,324,111 | 4/1982 | Edwards | 62/457.4 |
| 4,344,303 | 8/1982 | Kelly, Jr. | 62/457.4 |
| 4,399,668 | 8/1983 | Williamson | 62/372 |
| 4,986,089 | 1/1991 | Raab | 62/457.4 |
| 4,989,418 | 2/1991 | Hewlett | 62/457.4 |
| 5,514,170 | 5/1996 | Mauch | 62/530 |
| 5,934,100 | 8/1999 | Hornick | 62/457.4 |

Primary Examiner—William E. Tapolcai

[57] ABSTRACT

A portable food and beverage cooling device is disclosed and includes a flexible cooling pouch having outer and inner faces. A cooling pack is provided in the cooling pouch. The cooling pack comprises a plurality of alternating cooling cavities and connecting portions. Each of the cooling cavities of the cooling pack has a cooling substance therein capable of is cooled. A flexible insulating panel is provided in the cooling pouch. The insulating panel has a central region interposed between the outer face of the cooling pouch and the cooling pack. The insulating panel also has a pair of opposite side regions overlapping the cooling pack such that each side region of the insulating panel has a side portion interposed between the cooling pack and the inner face of the cooling pouch. The side portions of the side regions of the insulating panel face one another and are spaced apart from one another to define an air gap therebetween positioned between the cooling pack and the inner face of the cooling pouch.

9 Claims, 4 Drawing Sheets

PORTABLE FOOD AND BEVERAGE COOLING DEVICE

BACKGROUND OF THE INVENTION

Field of the Invention

The present invention relates to portable cooling and insulating devices which are used to keep food and beverages cold. In particular, it relates to freezable cooling devices which insulate and extract heat from food and beverage products before and during consumption.

There exist many re-usable, freezable liquids and gels which are used to cool food and beverages. In general, because of their size, shape and heat transfer characteristics, these existing devices can only be employed on specific containers or in insulated bags or iceboxes. These existing, freezable food and beverage cooling devices are not designed to change their heat transfer characteristics so that the rate of cooling can be controlled by the user. Many existing, individual, freezable, beverage cooling devices are bulky, non-flexible and cannot be used to cool and insulate most food products and many sizes and shapes of beverage containers. Many existing freezable beverage cooling devices make direct contact with the beverage and therefore must be kept very clean to remain sanitary. Most existing freezable cooling packs do not include insulation and therefore have a cold surface temperature which can create large amounts of condensation.

Examples of known prior art includes U.S. Pat. No. 4,399,668; U.S. Pat. No. 4,831,842; U.S. Pat. No. 4,183,226; U.S. Pat. No. 333,068; U.S. Pat. No. 4,344,303; and U.S. Pat. No. 2,589,577.

The present invention will cool and insulate food and beverages of almost any size and shape and will provide a method of quickly and conveniently preparing food and beverages for storage and transportation. The present device overcomes many of the disadvantages of prior food and beverage cooling devices by providing flexibility of use and control over the rate at which heat is transferred from the coolant to the item being cooled. The freezable coolant is insulated so that the surface temperature of the device is increased thereby reducing or eliminating condensation on the surface of the device.

When used to line the insides of insulated bags or ice boxes, the device increases the insulating capacity of the bag or ice box while simultaneously providing cooling energy. The device may also be used as a cold or warm compress.

When used on individual, pre-chilled beverage products which freeze at temperatures below 32° F. (0.0° C.), the present invention will chill the beverage to temperatures well below the temperature of melting ice, at normal atmospheric conditions. When in use, the device is never in direct contact with the beverage, thus reducing the importance of keeping the device clean. The invention is made of nontoxic, durable and washable materials. Before use, the invention is simply stored in a freezer to allow the coolant cells to freeze and be ready for use at a moments notice.

SUMMARY OF THE INVENTION

The present invention provides a re-usable, light weight, food and beverage cooling and insulating device. The containment structure provides a compact, versatile and flexible cooling pack in a form which can be easily employed on individual food items, beverage containers or in lunch bags and iceboxes. The containment structure contains a freezable coolant within multiple layers of insulation and vapor barriers which facilitate cooling and insulating food or beverage products. The structure of the present invention is such that the rate of heat transfer from the cooling cells to the items being cooled may be controlled by varying the amount of pressure applied to the inside face of the containment structure.

Adjustable air spaces greatly affect the heat transfer characteristics of the device and allow the cooling energy to be delivered when and where it is needed. In addition to absorbing heat from the item being cooled, the coolant intercepts heat flow from the environment to prolong the cold temperature condition of the item being cooled and insulated.

The vapor barrier envelope, in conjunction with the insulation, flexible baffles and air spaces, effectively insulates the coolant cells to slow the melting process. When pressure is applied to the device, the air spaces are reduced or eliminated and the rate of heat transfer greatly increases.

Engineering calculation show that the thermal resistance between the coolant and the beverage container has an R-value of 1.4 sq. ft ° F. hr/Btu when in the relaxed position (see FIG. 3) which, when depressed (see FIG. 3), will decrease to as low as 0.05 sq. ft ° F. hr/Btu.

By using very, thin layers between the coolant cells and the item being cooled, when pressure is applied, the heat transfer is so effective that it can chill food and beverages to temperatures below 30 degrees F. This invention is flexible, even when frozen, so that it may be molded around many different shapes. With the adjustable fastening devices, the invention may be held firmly in place around food items and beverage containers and allows the applied pressure to be easily adjusted. The fastening devices are fully adjustable so that a beverage can be tightly held to prevent the beverage container from slipping out the bottom. The fastening devices also facilitate the joining of more than one device at a time to cool and insulate larger items or to provide increased cooling and insulating capacity.

Another purpose of this invention is to provide a device to line the insides of backpacks, insulated bags or iceboxes. The device will increase the thermal insulation of insulating lunch bags and ice boxes while simultaneously providing a source of cooling energy. More than one device may be used at a time to increase the period of time that items are kept cold or to intensify the cooling action. This invention may be re-used many times, is light weight and collapses into a small, convenient package after use. It's flexibility and small size allow it to fit in the smallest of bags or freezers, such as portable or camper freezers. The device may also be used as a cold or warm compress.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
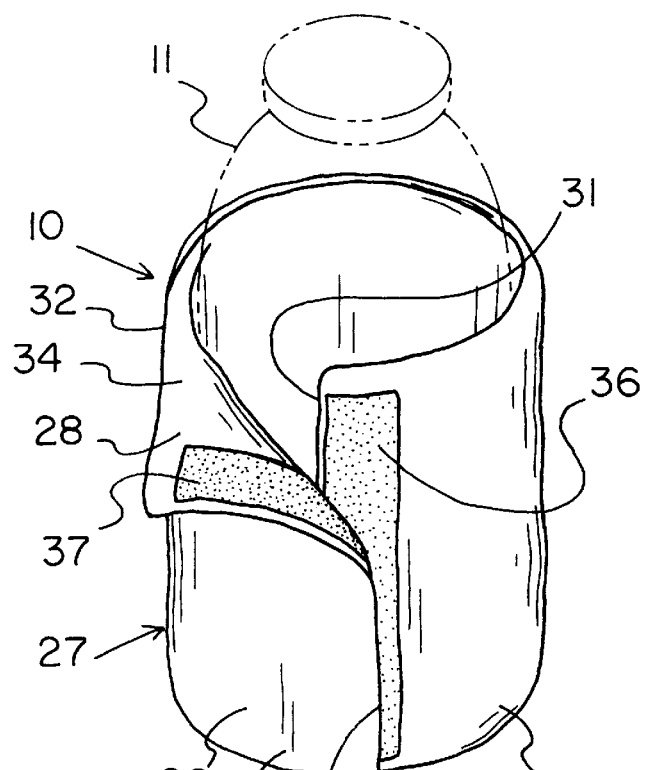
FIG. 1 is a schematic perspective view of a new portable food and beverage cooling device in use according to the present invention surrounding a portion of a beverage container such as a beverage bottle.
Figure 2:
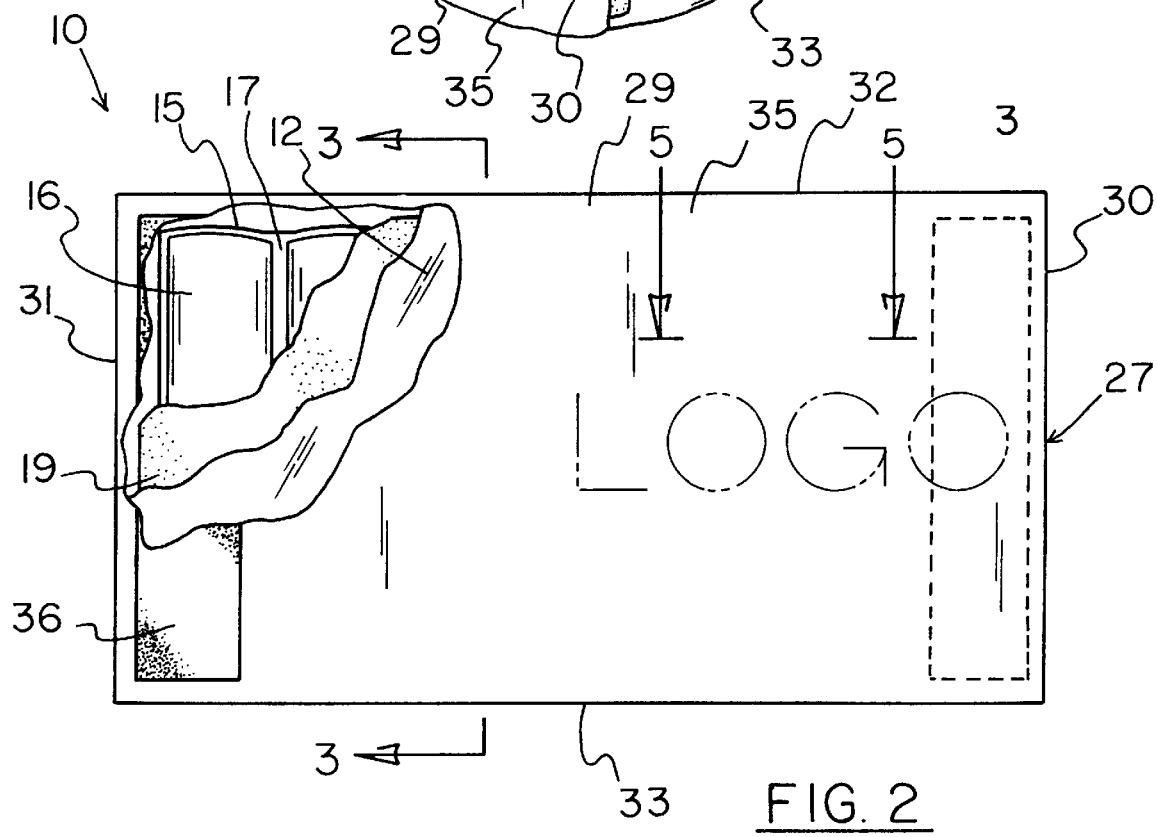
FIG. 2 is a schematic breakaway plan view of an exterior face of the present invention.
Figure 3:
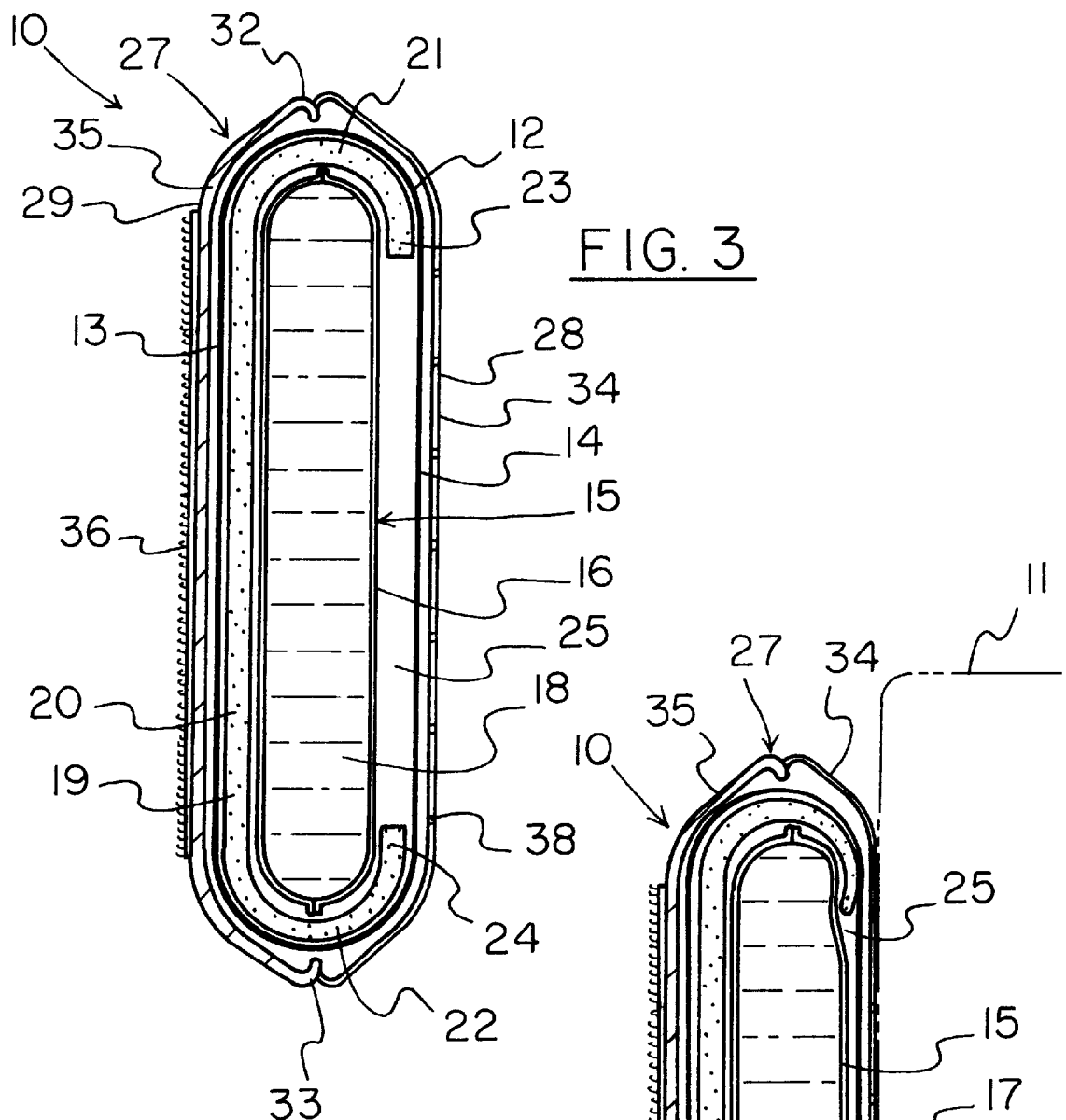
FIG. 3 is a schematic cross sectional view taken from line 3—3 of FIG. 2 of the present invention in a relaxed or insulating position.

As best illustrated in FIGS. 1 through 7, the portable food and beverage cooling device 10 generally comprises a flexible cooling pouch having outer and inner faces. A cooling pack is provided in the cooling pouch. The cooling pack comprises a plurality of alternating cooling cavities and connecting portions. Each of the cooling cavities of the cooling pack has a cooling substance therein capable of is cooled. A flexible insulating panel is provided in the cooling pouch. The insulating panel has a central region interposed between the outer face of the cooling pouch and the cooling pack. The insulating panel also has a pair of opposite side regions overlapping the cooling pack such that each side region of the insulating panel has a side portion interposed between the cooling pack and the inner face of the cooling pouch. The side portions of the side regions of the insulating panel face one another and are spaced apart from one another to define an air gap therebetween positioned between the cooling pack and the inner face of the cooling pouch.

In closer detail, the cooling device 10 is designed for wrapping around an object 11 and includes a generally rectangular flexible cooling pouch 12 having generally rectangular outer and inner faces 13,14 and a generally rectangular outer perimeter comprising a pair of substantially parallel opposite ends and a pair of substantially parallel sides extending between the end edges of the cooling pouch. The cooling pouch comprises a radiant energy reflective thin flexible sheet-like material for reflecting radiant energy. The cooling pouch should have a relatively low thermal heat capacity and thermal conductivity. This cooling pouch should also form a vapor barrier to prevent passage of vapor therethrough. In a preferred embodiment, the cooling pouch comprises a heat sealing Mylar, reflective thermoplastic or other similar material so that the containment structure will remain highly flexible at low temperatures and may be heat sealed.

A cooling pack 15 is provided in the cooling pouch such that the cooling pouch encloses the cooling pack. The cooling pack comprises a plurality of integrally connected and alternating generally cylindrical cooling cavities 16 and connecting portions 17 arranged in a row extending substantially across the cooling pouch between the ends of the cooling pouch such that each cooling cavity is spaced apart from the other cooling cavities and each connecting portion is spaced apart from the other connecting portions. The cooling cavities and connecting portions of the cooling pack are preferably extended substantially parallel to one another. The cooling pack is preferably constructed from a pair of containment sheets ideally comprising a material that maintains flexibility at below freezing temperatures, such as, for example, a thermoplastic or similar material so that the cooling cavities may be formed by heat sealing of the two containment sheets.

Each of the cooling cavities of the cooling pack has a cooling substance 18 therein capable of is cooled. Preferably, each of the cooling cavities is substantially filled with the cooling substance. Ideally, the cooling substance comprises a freezable gel or liquid, which changes state at 20 to 32 degrees F. While water may be used as the freezable coolant, other substances which have superior cold retention properties are preferred.

A flexible insulating panel 19 is provided in the cooling pouch and extending substantially across the cooling pouch between the ends of the cooling pouch. The insulating panel comprises a flexible and resiliently deformable material and preferably also foamed material. The insulating panel has a central region 20 interposed between the outer face of the cooling pouch and the cooling pack.

The insulating panel also has a pair of opposite side regions 21,22. One of the side regions of the insulating panel is positioned adjacent one side of the cooling pouch and the other of the side regions of the insulating panel is positioned adjacent the other of the sides of the cooling pouch. The side regions of the insulating panel overlap corresponding sides of the cooling pack such that each side region of the insulating panel has a side portion 23,24 interposed between the cooling pack and the inner face of the cooling pouch.

The side portions of the side regions of the insulating panel face one another and are spaced apart from one another to define an air gap 25 therebetween positioned between the cooling pack and the inner face of the cooling pouch.

In one preferred embodiment, a spaced apart plurality of resiliently deformable baffles 26 may be provided in the pouch in the air space. Each of the baffles is preferably positioned adjacent an associated connecting portion of the cooling pack such that each baffle is positioned between two adjacent cooling cavities of the cooling pack. The baffles are ideally extended substantially parallel to the cooling cavities.

Figure 4:
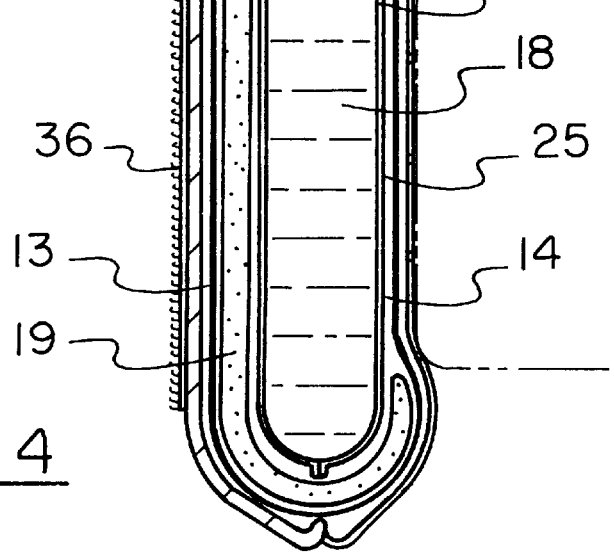
FIG. 4 is a schematic cross sectional view taken from the same vantage as FIG. 3 of the present invention in a depressed or heat transfer position.
Figure 5:
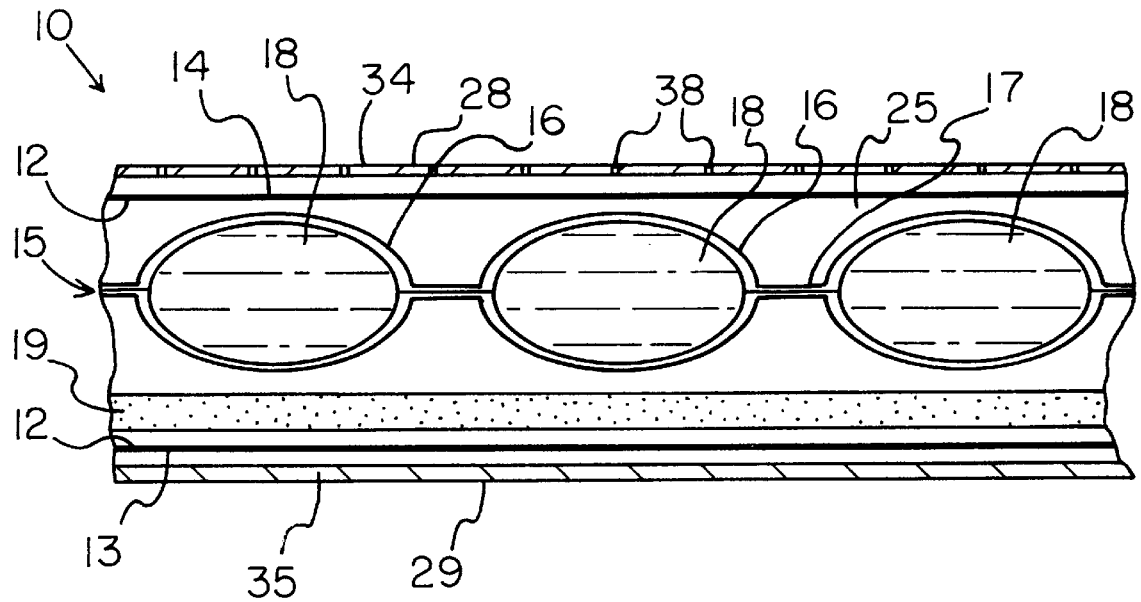
FIG. 5 is a schematic cross sectional view taken from line 5—5 of FIG. 2 of an embodiment of the present invention.
Figure 6:
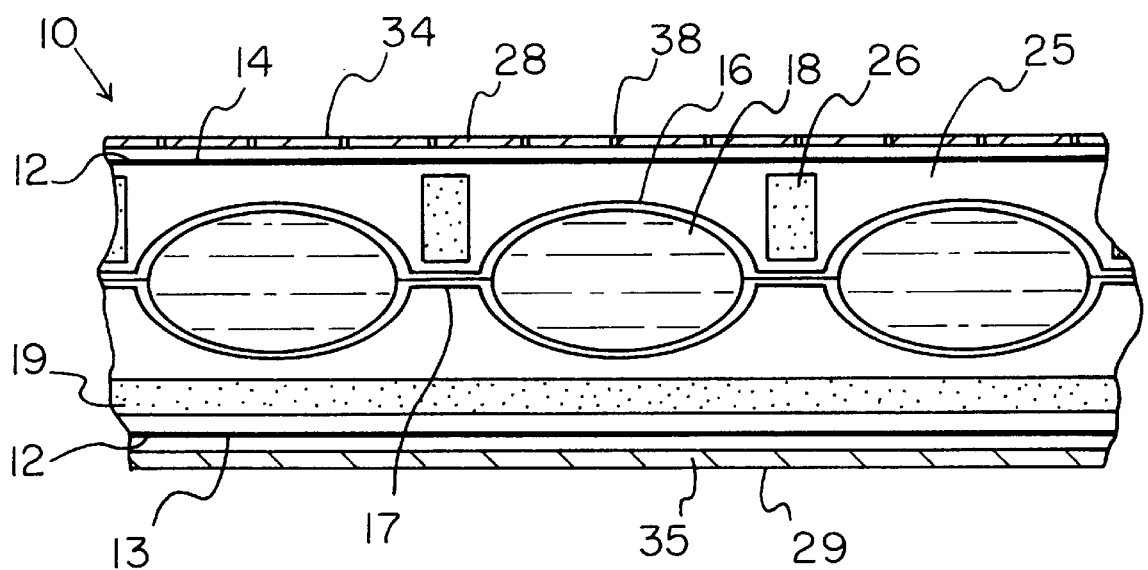
FIG. 6 is a schematic cross view taken from the same vantage as FIG. 5 of another embodiment of the present invention having optional flexible baffles therein used to enhance the insulating air spaces between the coolant cells and the items being cooled.
Figure 7:
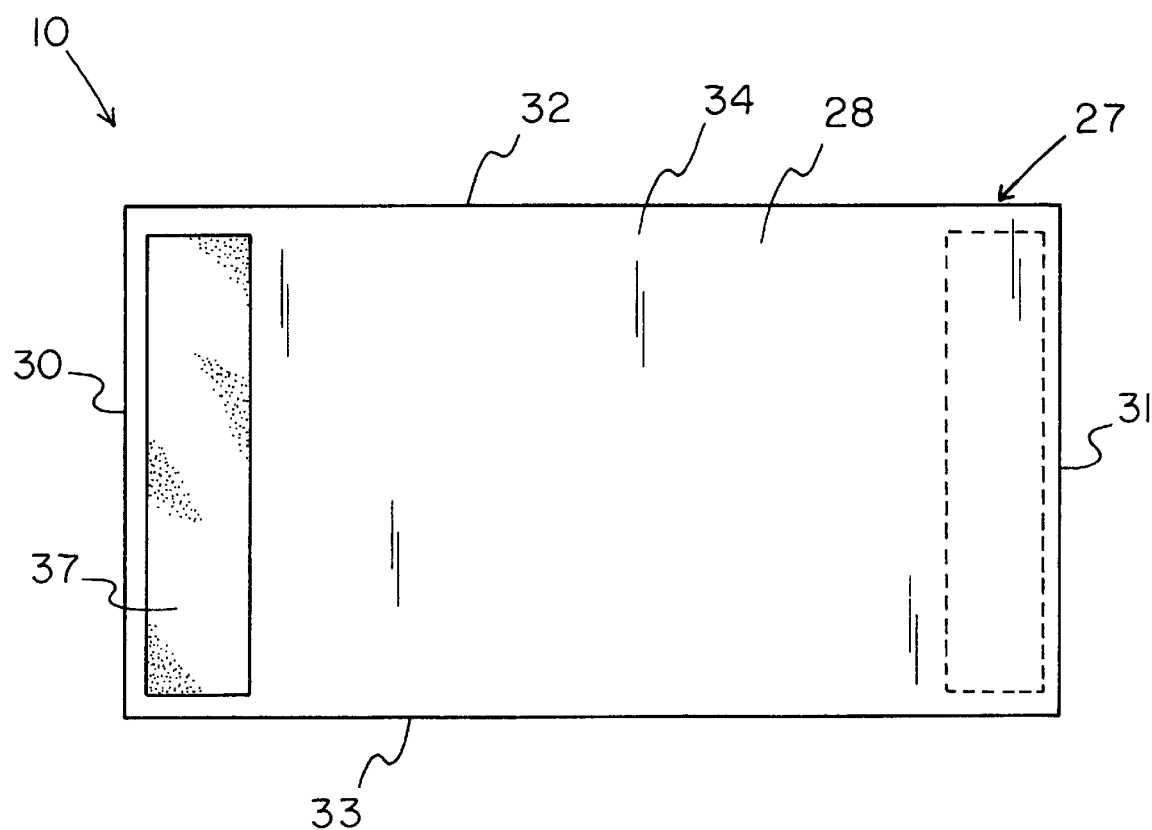
FIG. 7 is a schematic plan view of the interior face of the present invention.

In use, the connecting portions form flexible regions between the coolant cells which allow the cooling pack and the rest of the structure to remain partially flexible, even when frozen, and also help define stalls in the air space which can be eliminated through small amounts of pressure as illustrated in FIG. 4. The baffles serve as spacers to bias the inner face of the cooling pouch away from the cooling pack to keep the air space as wide as possible in a relaxed state when the baffles are not compressed or deformed.

In a preferred embodiment, a flexible protective cover 27 is provided to substantially enclose the cooling pouch. The protective cover has inner and outer faces 28,29 and a generally rectangular outer perimeter comprises a pair of ends 30,31 and a pair of sides 32,33 extending between the ends of the protective cover. Optionally, the cooling pouch may be directly coupled to the protective cover. The outer face of the cooling pouch is positioned adjacent the outer face of the protective cover. The inner face of the cooling pouch is positioned adjacent the inner face of the protective cover. Each of the ends of the cooling pouch is positioned adjacent a corresponding end of the protective cover, each of the sides of the cooling pouch is positioned adjacent a corresponding end of the protective cover.

The protective cover preferably comprises generally rectangular inner and outer panels 34,35 coupled together along the outer perimeter of the protective cover. The panels of the protective cover ideally each comprise a flexible fabric material.

The ends of the protective cover are coupled together to form the protective cover, the cooling pouch, and the cooling pack into a generally ring shape configuration around an object to be cooled by the device as illustrated in FIG. 1. In one embodiment, a hook and loop fastener is used to couple the ends of the protective cover to permit detachably attachment of the ends of the protective cover. In such an embodiment, the hook and loop fastener has a pair of complementary portions detachably attachable to one another. One of the portions 36 of the hook and loop fastener is coupled to the outer face of the protective cover. The other of the portions 37 of the hook and loop fastener is coupled to the inner face of the protective cover.

Ideally, the inner panel of the protective cover has a plurality of apertures 38 therethrough to permit the passage of air through the inner panel to enhance breathability of the inner panel.

The number and size of the cooling cavities will vary depending on the desired size of the finished containment structure. The method of practicing the present invention includes storing the device in a freezing environment such as the freezing compartment of a refrigerator. When the device is frozen, it may be removed from the freezing environment and wrapped firmly or loosely around food and beverage products. In order to cool items quickly, the device is wrapped firmly around them. Optionally, to make the cooling effects last longer, the device may be wrapped loosely around the item to be cooled and insulated. With items which are pre-chilled, the cooling intensity and duration is increased.

It is believed that the operation and construction of the invention will be apparent from the description above and the Figures. While the embodiment of the present invention is characterized as is preferred, it is possible that various changes and modifications may be made without departing from the spirit and scope of the invention as defined in the following claims.

I claim:

1. A cooling device for wrapping around an object, comprising:

a flexible cooling pouch having outer and inner faces;

a cooling pack being provided in said cooling pouch, said cooling pack comprising a plurality of alternating cooling cavities and connecting portions;

each of said cooling cavities of said cooling pack having a cooling substance therein capable of being cooled;

a flexible insulating panel being provided in said cooling pouch, said insulating panel having a central region interposed between said outer face of said cooling pouch and said cooling pack, said insulating panel having a pair of opposite side regions overlapping said cooling pack such that each side region of said insulating panel has a side portion interposed between said cooling pack and said inner face of said cooling pouch;

said side portions of said side regions of said insulating panel facing one another and being spaced apart from one another to define an air gap therebetween, said air gap being positioned between said cooling pack and said inner face of said cooling pouch; and a spaced apart plurality of resiliently deformable baffles being provided in said pouch in said air space.

2. The cooling device of claim 1, wherein said cooling pouch comprises a radiant energy reflective flexible material.

3. The cooling device of claim 1, wherein said cooling cavities and connecting portions of said cooling pack are extended substantially parallel to one another.

4. The cooling device of claim 1, wherein each of said cooling cavities is substantially filled with said cooling substance.

5. The cooling device of claim 1, wherein each of said baffles is positioned adjacent an associated connecting portion of said cooling pack such that each baffle is positioned between two adjacent cooling cavities of said cooling pack.

6. The cooling device of claim 1, further comprising a flexible protective cover substantially enclosing said cooling pouch.

7. The cooling device of claim 6, wherein said protective cover has a pair of opposite ends coupled together to form said protective cover, said cooling pouch, and said cooling pack into a generally ring shape configuration around an object.

8. The cooling device of claim 7, wherein a hook and loop fastener couples said ends of said protective cover to permit detachably attachment of said ends of said protective cover.

9. A cooling device for wrapping around an object, comprising:

a generally rectangular flexible cooling pouch having generally rectangular outer and inner faces and a generally rectangular outer perimeter comprising a pair of substantially parallel opposite ends and a pair of substantially parallel sides extending between said end edges of said cooling pouch;

said cooling pouch comprising a radiant energy reflective flexible;

a cooling pack being provided in said cooling pouch;

said cooling pack comprising a plurality of alternating generally cylindrical cooling cavities and connecting portions arranged in a row extending between said ends of said cooling pouch;

said cooling cavities and connecting portions of said cooling pack being extended substantially parallel to one another;

each of said cooling cavities of said cooling pack having a cooling substance therein capable of being cooled, wherein each of said cooling cavities is substantially filled with said cooling substance;

a flexible insulating panel being provided in said cooling pouch between said ends of said cooling pouch;

said insulating panel having a central region interposed between said outer face of said cooling pouch and said cooling pack;

said insulating panel having a pair of opposite side regions, one of said side regions of said insulating panel being positioned adjacent one side of said cooling pouch and the other of said side regions of said insulating panel being positioned adjacent the other of said sides of said cooling pouch;

said side regions of said insulating panel overlapping corresponding side regions of said cooling pack such that each side region of said insulating panel has a side portion interposed between said cooling pack and said inner face of said cooling pouch;

said side portions of said side regions of said insulating panel facing one another and being spaced apart from one another to define an air gap therebetween positioned between said cooling pack and said inner face of said cooling pouch;

a spaced apart plurality of resiliently deformable baffles being provided in said pouch in said air space, each of said baffles being positioned adjacent an associated connecting portion of said cooling pack such that each baffle is positioned between two adjacent cooling cavities of said cooling pack;

a flexible protective cover substantially enclosing said cooling pouch, said protective cover having inner and outer faces and a generally rectangular outer perimeter comprising a pair of ends and a pair of sides extending between said ends of said protective cover;

said outer face of said cooling pouch being positioned adjacent said outer face of said protective cover;

said inner face of said cooling pouch being positioned adjacent said inner face of said protective cover;

said protective cover comprising generally rectangular inner and outer panels coupled together along said outer perimeter of said protective cover;

said ends of said protective cover being coupled together to form said protective cover, said cooling pouch, and said cooling pack into a generally ring shape configuration around an object;

wherein a hook and loop fastener couples said ends of said protective cover to permit detachably attachment of said ends of said protective cover; and said hook and loop fastener having a pair of complementary portions detachably attachable to one another, one of said portions of said hook and loop fastener being coupled to said outer face of said protective cover, the other of said portions of said hook and loop fastener being coupled to said inner face of said protective cover.

* * * * *